Jan. 20, 1942.   T. B. CHACE   2,270,830
MOLD
Original Filed Aug. 12, 1937   3 Sheets-Sheet 1
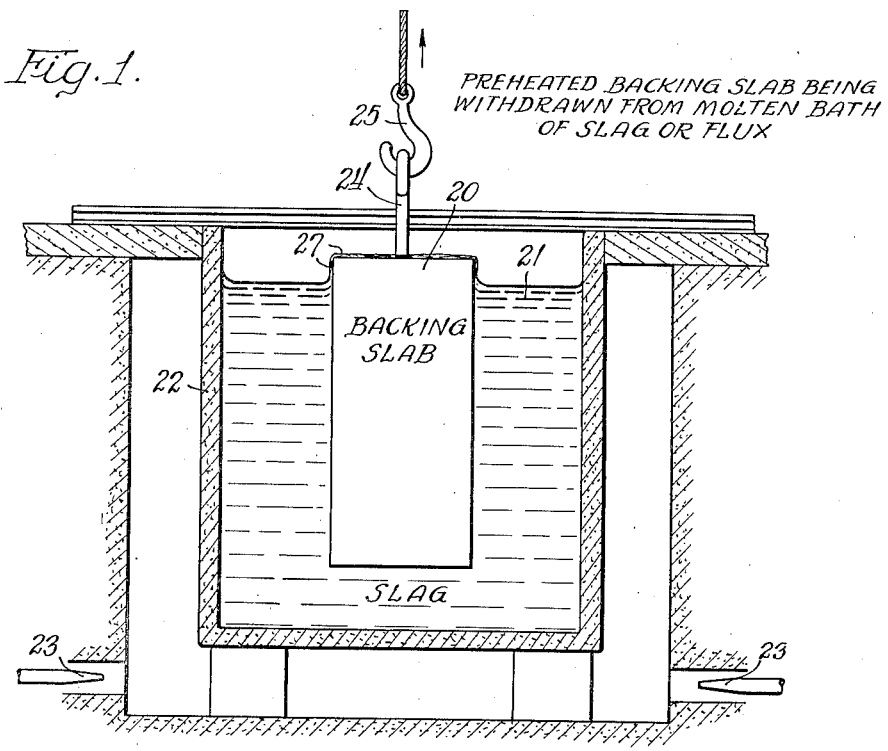
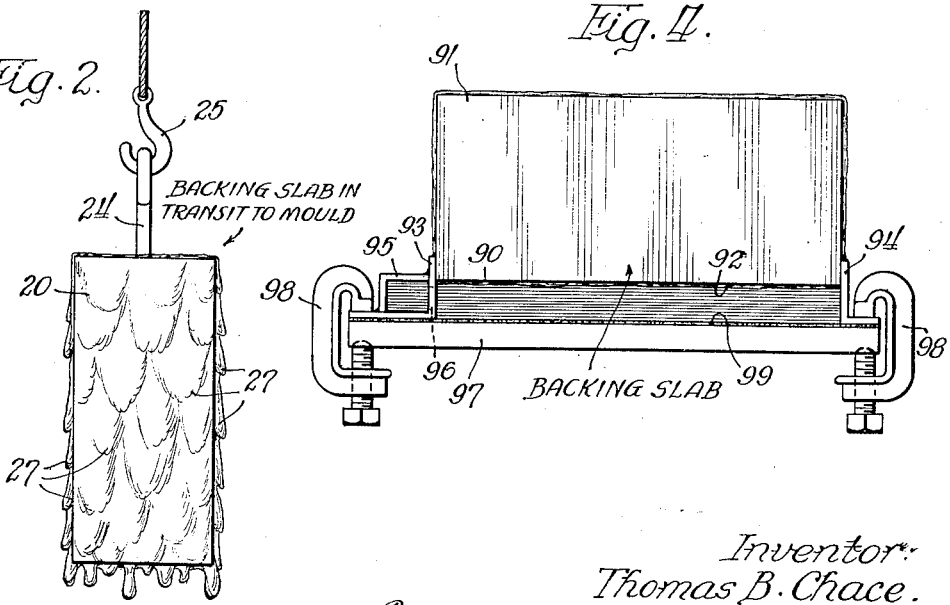
Inventor:
Thomas B. Chace.

Jan. 20, 1942.  T. B. CHACE  2,270,830
MOLD
Original Filed Aug. 12, 1937   3 Sheets-Sheet 2
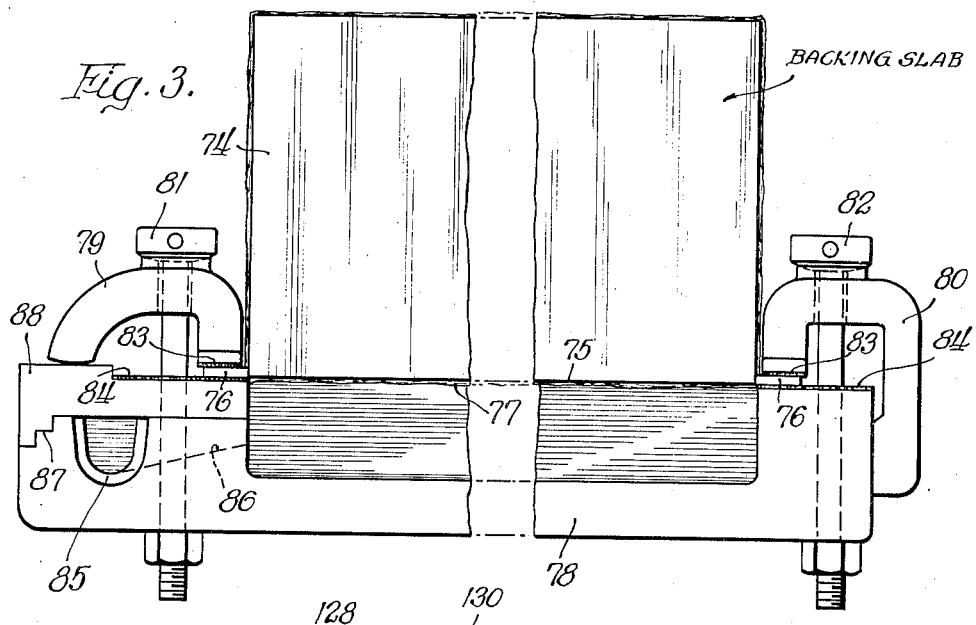
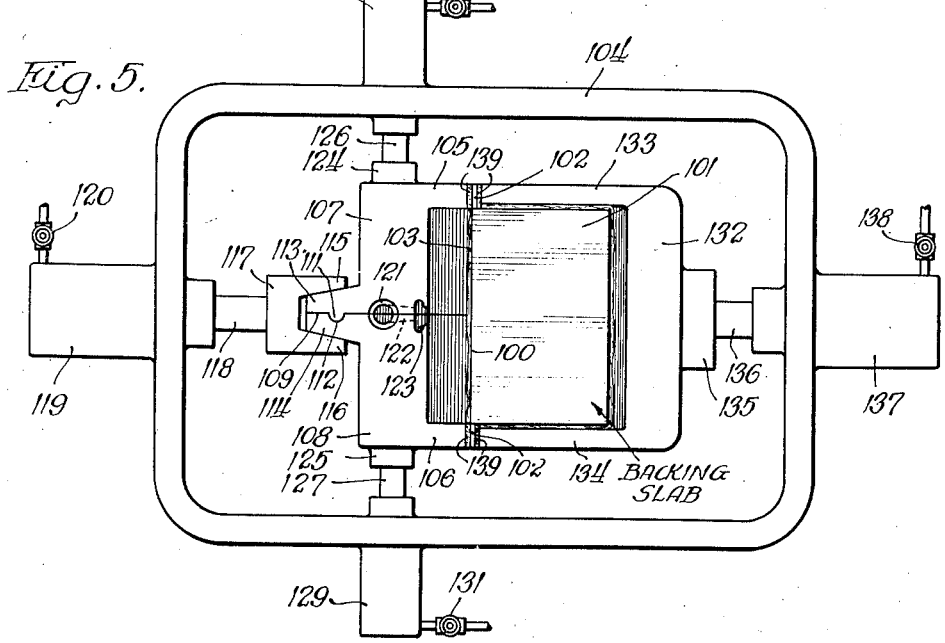
Inventor.
Thomas B. Chace.

Jan. 20, 1942.  T. B. CHACE  2,270,830
MOLD
Original Filed Aug. 12, 1937  3 Sheets—Sheet 3
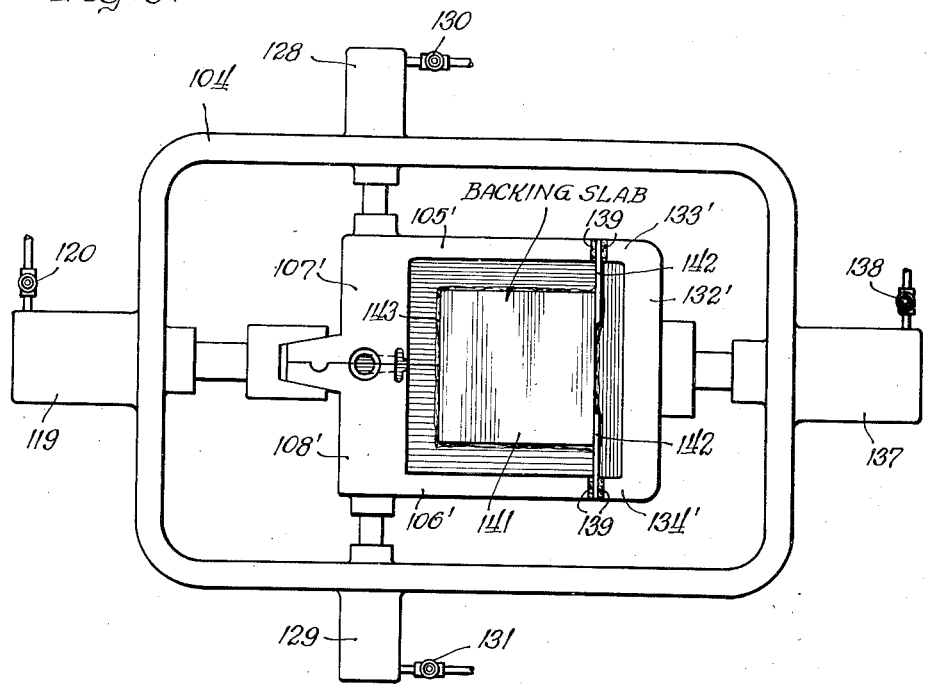
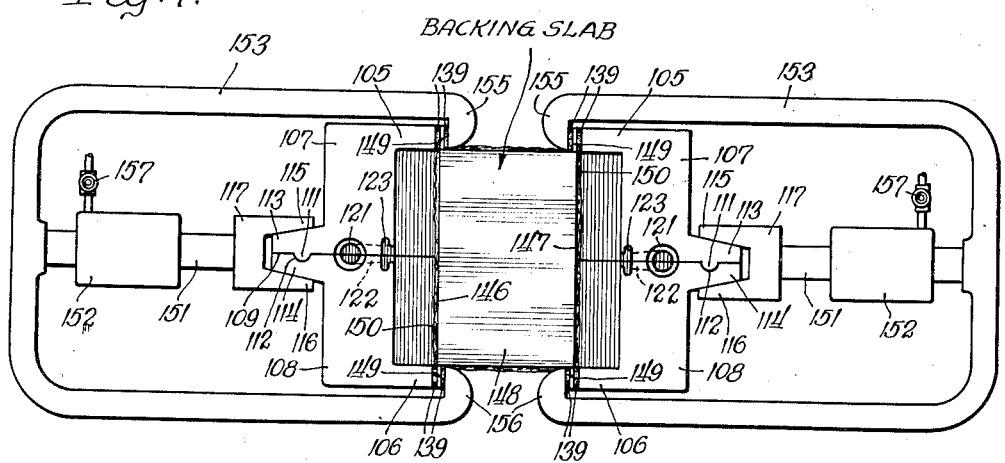
Inventor:
Thomas B. Chace.

Patented Jan. 20, 1942

2,270,830

UNITED STATES PATENT OFFICE 2,270,830

MOULD

Thomas B. Chace, Winnetka, Ill., assignor to Clad Metals Industries, Inc., Chicago, Ill., a corporation of Illinois Original application August 12, 1937, Serial No. 158,656. Divided and this application December 26, 1939, Serial No. 310,895

7 Claims. (Cl. 22—116)

My invention relates, generally, to methods and means for manufacturing composite metal slabs and it has particular relation to improved means for casting a cladding metal onto one or more surfaces of a backing slab and confining the casting metal to the desired welding surfaces. This application is a division of my copending application Serial No. 158,656, filed August 12, 1937, now Patent No. 2,211,922.

The object of my invention, generally stated, is to provide mould means for casting cladding metal on one or more surfaces of a backing slab and retaining or confining the molten cladding metal to the surfaces to be cladded.

Other objects of my invention will, in part, be obvious and in part appear hereinafter.

Accordingly, my invention is disclosed in the embodiments thereof shown in the accompanying drawings, and it comprises the features of construction, combination of elements, and arrangement of parts which will be exemplified as hereinafter set forth, and the scope of the application of which will be indicated in the appended claims.

For a more complete understanding of the nature and scope of my invention, reference may be had to the following detailed description taken in connection with the accompanying drawings, in which:

Figure 1 is a vertical sectional view of a soaking pit in which a slab of backing metal may be preheated in a flux or slag bath;

Figure 2 shows the surface of the backing slab protected from oxidation by the air by a coating of slag or flux while it is being transferred from the soaking pit to the casting operation;

Figure 3 is a top plan view of a mould construction that may be employed for cladding only one face of a backing slab;

Figure 4 is a modified form of the mould construction of Figure 3;

Figure 5 shows still another form of mould construction for casting cladding metal onto only one surface of a backing slab;

Figure 6 shows a mould construction similar to that shown in Figure 5 but arranged to cast the cladding metal onto three surfaces of the backing slab; and Figure 7 shows a modified form of mould construction for cladding two opposite faces of a backing slab.

With a view to practicing my invention, a steel backing slab 20, Figure 1, of suitable size is cleaned on the desired welding surfaces, preferably by sand blasting, and then lowered into a molten bath 21 of viscous substance in a suitable container 22 that is heated by any suitable means, such as by gas supplied by the nozzles 23, to maintain it in the molten state for preheating the backing slab 20. An eye 24 may be threaded into the top of the backing slab 20 to permit it to be picked up by a hook 25 of a crane for lifting into and out of the container 22. As shown at 27 in Figure 2 of the drawings, the surfaces of the backing slab 20 are covered by a layer 27 of material forming the bath 21 so that, during transit and after the slab 20 has been removed from the bath 21, its surfaces are prevented from contact with the air and are, therefore, not oxidized. The exact chemistry of the bath 21 is dependent on the combinations of metal to be clad and the required preheating temperatures. The required properties are a relatively low melting temperature and a relatively high viscosity at temperatures well above the melting temperature. For instance, for preheating temperatures around 2300° F. I have found that a mixture of about 80% borax and 20% by weight boric acid is suitable. The fusing temperature and viscosity of the bath 21 may be increased by adding more borax, silicic acid, or quartz. It may be decreased by increasing the boric acid content. A base of cullet (broken glass) with boric acid added to decrease the viscosity has been found usable. The bath 21 is in the form of slag or flux. The melting temperature of the bath 21 should be low enough so that, when it is heated to about 2300° F., it does not chill below its fusing temperature when the cold backing slab 20 is lowered into it.

The backing slab 20 is left in the bath 21 of slag or flux until it is thoroughly preheated. The time required is usually about one hour for each inch of thickness of the slab 20. During preheating the surfaces of the slab 20 are perfectly sealed from the atmosphere by the bath 21 and, on removing it therefrom for transporting it to the casting operation, a layer of the slag or flux forming the bath 21 of about $\frac{1}{32}$ of an inch in thickness clings to its surfaces as indicated at 27 in Figure 2. As a result of numerous tests on slabs preheated in a bath 21 having the correct composition, I have found, on cooling the slab to room temperature, that its surface under the coating 27 is clean and entirely free from oxidation. The layer 27 of slag or flux hardens on cooling below its melting temperature and may be broken off readily when desired. However, during transit of the slab 20 from the bath 21, the layer 27 clings to the surface of the slab 20 and will withstand relatively rough handling without exposing the surface to which cladding metal is to be applied. If the slab 20 is scraped against an object during transit to the casting operation, the layer 27 may become parted but will quickly close before any substantial oxidation can take place. Of course, the heat stored in the preheated slab 20 will keep the layer 27 viscous for a relatively long time so that it is unnecessary to take special precautions for quick casting after the slab 20 has been removed from the bath 21.

The cladding metal is generally of the character that cannot be readily cast in a mould of the open face type. This is particularly true when the composite slab is intended to have a smooth rollable surface after casting and bonding of the facing metal onto the backing slab so that they will not separate on subsequent working. Metals, such as pure copper, and alloys, such as high nickel-copper alloys and copper-nickel-zinc alloys in the molten state, are very susceptible to the occlusion of gases and form a thick dross on the exposed casting surface. Such metals and alloys should be cast in a vertical mould so that the dross and unrollable part is formed on the upper end of the composite slab rather than on a rolling side surface.

I have found that other copper alloys, such as silicon-nickel-copper alloys, can be readily cast onto backing slabs in accordance with my invention. The nickel in these alloys is employed to facilitate bonding to the backing slab and the silicon-nickel in combination forms nickel silicides for the purpose of making the copper more refractory so that it has substantially the same compression resistance in rolling or working as the steel backing slab. This is of particular importance for copper clad steel that is clad on two or more sides since such composite slabs are often rolled into products such as I beams, Z bars, and the like on suitably shaped rolls. Such products require diamond, oval, and other irregular shaped passes and, of course, it is essential that the two metals forming the composite slab elongate the same amount for each pass. In order to accomplish this, I vary the silicon and nickel content of the copper facing alloy to suit the carbon content of the steel. For example, the resistance to compression or force of the rolls with the same compression rate at 1600° F. for wrought iron of about 0.02% carbon, mild steel of about 0.08% and medium steel of about 0.45% carbon is respectively 14,000, 21,000, and 33,000 pounds per square inch. To secure the same properties in the composite slab so that it rolls as if it were made of a single metal, I use with wrought iron of about 0.02% to 0.04% carbon a copper alloy of approximately 0.25% to 0.50% silicon and 0.60% to 0.75% nickel. For mild steel having a carbon content of from 0.08% to 0.12% I use 0.50% to 0.90% silicon and 1.0% to 1.25% nickel. For medium steel having a carbon content from 0.25% to 0.45% I use approximately 1.2% to 1.5% silicon and 1.5% to 2.0% nickel. I find that, if the nickel content is kept slightly in excess of the silicon content, bonding is greatly facilitated without requiring any extended soaking with the copper in the molten state. This also seems to eliminate any hot or cold short ranges in annealing or rolling.

In Figure 3 of the drawings, I have shown a mould construction that is suitable for vertically casting cladding metal on one surface only. Provision for cladding one surface only of a backing slab presents a difficult problem in mould design since it is not easy to hold the highly heated and fluid molten facing metal in contact with the preheated backing slab and confine it to only one surface. The problem differs from ordinary casting in that facing metal usually has to be heated to a relatively high temperature well above its melting point and, since the backing slab is preheated to a high temperature, the facing metal remains molten for a comparatively long period during which it must be confined. Even if it were practical to fit the backing slab into a mould while both were cold, it would necessitate heating the mould during preheating of the slab which, of course, would shorten the life of the mould considerably, and then, too, there is the problem of expansion of the slab in the mould during preheating which must be taken into account. The futility of attempting to fit a large preheated slab of one thousand pounds or over, for example, into a conventional type mould and sealing the edges so that the molten facing metal is confined to one or several surfaces only is quite obvious.

With a view to solving this problem and cladding the backing slab 74 on one surface 75 only, I weld along the two sides of this surface comparatively thin steel strips 76. It will be observed that these strips 76 are generally aligned with the welding surface 75 so that they present a continuation thereof. The strips 76 are welded along two vertical sides only of the backing slab 74 since, for casting purposes, it may be removed from a soaking pit, for example the molten bath 21 of Figure 1, and placed in an upright position on a casting floor formed of sand. The sand will then form the bottom of the mould space. The surfaces of the slab 74 and particularly the welding surface 75 may be protected from oxidation by a layer 77 of slag or flux, as described hereinbefore.

The mould space may be completed by a mould member 78 that is generally in the form of a half section of a conventional mould. The ends of the mould member 78 are turned inwardly and adapted to be clamped in fluid tight relationship against the steel strips 76 by suitable clamp members 79 and 80 that may be drawn up and clamped in place by suitable bolts 81 and 82, as illustrated. The surfaces between the mould member 78 and the steel strips 76, and between the clamps 79 and 80 and these thin steel strips 76 may be lined with asbestos gaskets 83 and 84 to not only seal the mould but also to keep the mould member 78 and the clamps 79 and 80 from welding to the steel strips 76. In this manner the mould parts are readily removed as soon as the facing metal has solidified.

In order to pour the facing metal into the mould space formed between the surface 75 of the backing slab 74 and the inner surface of the mould member 78, a pouring sprue or spout 85 is provided in the lefthand end of the mould member 78, as shown. A gate 86, opening into the mould space is provided at the bottom of the sprue or spout 85 to permit bottom pouring. It will be noted that the lefthand end of the mould member 78 is split to provide a parting line 87 formed between the mould member 78 proper and a spacer 88. Since the spacing member 88 readily separates from the remainder of the mould member 78 after the facing metal has solidified in the sprue or spout 85 and the gate 86, it is a relatively simple matter to remove this solidified metal and prepare the mould for reuse.

In operation the backing slab 74 may be preheated in a bath of molten slag or flux, as described hereinbefore, until it has reached the desired temperature. It is then picked up by a suitable crane and deposited on the casting floor in an upright position. The mould member 78 with the spacer member 88 are then assembled and clamped to the thin steel strips 76, the clamping being effected from the cold side of the mould member 78, as will be readily understood. The molten facing metal is then poured into the sprue or spout 85 and runs through the gate 86 into the mould space, the bottom of which is formed by the sand of the foundry floor. After the cladding metal has solidified, the bolts 81 and 82 are loosened and the mould member 78 and the spacer 88 are removed. This leaves the cladding metal and the portion thereof that had solidified in the sprue or spout 85 and the gate 86 integral with the backing slab 74. Since the gate 86 is relatively small, it is a simple matter to break off or cut the portion of the cladding metal that was cast in the sprue or spout 85 and the gate 86. The composite slab is then ready for rolling according to standard steel mill rolling practice.

One great utility of the type of mould construction shown in Figure 3 is that spacers of various thicknesses can be used between the mould member 78 and the steel strips 76 or the backing slab 74 to increase the mould casting space. In other words, a standard width backing slab 74 can be used and the thickness of the backing slab can be varied within a wide range, and, at the same time, the casting space for the facing metal may also be varied by suitable spacers to produce the proper relative thickness of facing metal to the thickness of the backing slab. Such an arrangement eliminates the necessity for a large stock of mould sizes since, if the thickness of the composite slab can be readily varied, it can be rolled to comply with width and length variables in the finished product.

In Figure 4 of the drawings I have illustrated another form of mould construction that is suitable for casting cladding metal on one surface 90 of a backing slab 91. As described hereinbefore, the backing slab 91 may first be preheated in a suitable bath of slag or flux and its surfaces, at least the surface 90, is protected from oxidation by layer 92 of the slag or flux. Prior to the preheating of the backing slab 91, relatively thin steel angles 93 and 94 are welded to opposite sides of the backing slab 91 along the vertical edges of the surface 90 that is to be clad. Another angle 95 is welded in the corner formed by the flanges of the angle 93 to provide a pouring sprue or spout. At the lower end an aperture 96 is provided in one of the flanges of the angle 93 to provide a gate for the molten cladding metal. The mould space formed by the surface 90 and the opposite flanges of the angles 93 and 94 is completed by a plate 97, the edges of which may be clamped to the angles 93 and 94 by suitable C-clamps 98, as shown. A liner 99 of suitable material, such as asbestos, may be provided on the inside surface of the plate 97 to prevent its being welded to the angles 93 and 94, and the cladding metal being welded to it.

In Figure 5 of the drawings, I have illustrated a mould construction that may be readily applied for casting cladding metal on one surface 100 only of a backing slab 101 that may be remotely operated so that it is unnecessary for one to closely approach the preheated backing slab. Prior to cleaning and preheating the backing slab 101, relatively thin steel strips 102 are welded along the edges of the surface 100. The backing slab 101 is then preheated in a suitable bath of slag or flux and when lifted therefrom and placed on the casting floor, the layer 103 of slag or flux protects the surface 100 from oxidation.

The backing slab 101 may be positioned within a suitable frame 104 on the casting floor that is provided for purposes which will presently be apparent. The mould space is formed by juxtaposing the arms 105 and 106 of the mould pieces 107 and 108 with the steel strips 102, as illustrated. The mould pieces 107 and 108 are separated along a parting line 109 and are provided respectively with a tongue 111 and a groove 112 to prevent leakage of the molten cladding metal. The mould pieces 107 and 108 are held or clamped together by integrally formed wedge-shaped portions 113 and 114 that interfit with the outwardly flared jaws 115 and 116 of a head 117 which is carried by a plunger 118. The plunger 118 forms a part of a suitable hydraulic ram 119 that may be supplied from any suitable source of fluid pressure through a valve 120. By applying fluid pressure to the ram 119, the head 117 is forced toward the backing slab 101 and thereby not only holds the mould pieces 107 and 108 in position but also, by virtue of the clamping action between the jaws 115 and 116 and the wedge-shaped portions 113 and 114, these mould pieces 107 and 108 are maintained in the desired relation.

Along the parting line 109 a pouring sprue or spout 121 may be provided having a gate 122 at the bottom to provide for bottom pouring of the cladding metal. A groove 123 is provided for receiving a suitable valve member, for separating the molten metal in the sprue or spout 121 and the gate 122 from the cladding metal in the mould space. It will be understood that the valve member will be inserted in the groove 123 and that it will be moved downwardly to separate the bottom portions of molten cladding metal when the mould space has been filled therewith.

It will be observed that the hydraulic ram 119 is mounted on the frame 104. With a view to further providing for facilitating the handling of the mould pieces 107 and 108, heads 124 and 125 mounted on plungers 126 and 127 of additional hydraulic rams 128 and 129, carried by the frame 104, are provided for engaging the opposite sides of these pieces as illustrated. Valves 130 and 131 may be provided for controlling the application of fluid pressure to the hydraulic rams 128 and 129.

Since the relatively thin steel strips 102 may be bent on application thereto of pressure on movement of the mould pieces 107 and 108 by the hydraulic ram 119, it is desirable that some means be provided for preventing this distortion. For this purpose a generally C-shaped member is provided, the arms 133 and 134 of which are arranged to engage the rear side of the steel strips 102, as shown. The C-shaped member 132 may be carried by a head 135 that is supported on a plunger 136 of a hydraulic ram 137. A valve 138 may be provided for supplying suitable pressure to the ram 137. Suitable strips 139 of asbestos or like material may be disposed along the opposite faces of the steel strips 102 that are engaged by the arms 105 and 106 of the mould pieces 107 and 108 and by the arms 133 and 134 of the C-shaped member 132 to prevent welding taking place therebetween.

By the provision of the apparatus shown in Figure 5, it is possible to quickly and easily make up the mould for receiving the molten cladding metal and at the same time the operator is not directly exposed to the heat of the backing slab 101. If desired, the hydraulic ram units 119, 128, 129, and 137 may be adjustably mounted in the frame 104 so that it is unnecessary to accurately position the backing slab 101 therein.

In Figure 6 of the drawings, I have shown a mould construction, similar to that shown in Figure 5, but arranged to provide a mould space with three surfaces of a backing slab 141, rather than a single surface. As shown, relatively thin steel strips 142 may be welded to the surface of the backing slab 141 that is not to be clad, prior to preheating and cleaning. When the backing slab 141 is deposited on the casting floor, it is provided with the layer 143 of slag or flux for preventing the oxidation of the three welding surfaces.

The mould space is formed in part by the mould sections 107' and 108' and arms thereof 105' and 106' which are juxtaposed with the steel strips 142. Arms 133' and 134' of a C-shaped member 132' serve to back up the opposite sides of the steel strips 142, as described hereinbefore. Suitable strips 139 of asbestos or the like may be positioned on opposite sides of the steel strips 142 to prevent welding of the mould and clamp arms thereto.

In Figure 7 of the drawings, I have provided a mould construction that permits the cladding of the opposite surfaces 146 and 147 of a backing slab 148. Prior to cleaning and preheating relatively thin steel strips 149 are welded to the opposite corners of the backing slab 148, as shown. The backing slab 148 is then cleaned and preheated to the desired temperature. When the backing slab 148 is placed on the casting floor, its welding surfaces 146 and 147, at least, are covered by the layer 150 of slag or flux to prevent oxidation thereof, as described previously. A mould space is formed with each of the surfaces 146 and 147 by the two-piece mould 107 and 108, such as shown in Figure 5 and described hereinbefore. The heads 117 carrying the flared jaws 115 and 116 may be mounted on plungers 151 of hydraulic rams 152 which may be mounted on clamp members 153. The outer ends 155 and 156 of the clamp members 153 are turned inwardly to back up the sides of the steel strips 149 opposite the arms 105 and 106 of the mould pieces 107 and 108. Valves 157 may be provided for controlling the flow of fluid from any suitable pressure source to the hydraulic rams 152. Strips 139 of asbestos may be provided on opposite sides of the steel strips 149 to prevent welding thereto of the clamping members.

When the mould construction shown in Figure 7 is employed, it is possible to cast in the mould spaces formed with the surfaces 146 and 147 the same cladding metal or two different cladding metals may be employed. Moreover, the casting may take place at different temperatures. For example, the backing slab 148 may be preheated to a temperature of about 2400° F. Stainless steel, which pours at about 3000° F., may be cast in one of the mould spaces, for example, the space formed with the surface 146. The backing slab and cladding metal may then be permitted to cool to about 2250° F., and then a cladding metal of copper or copper alloy may be poured into the mould space formed with the surface 147.

Since certain further changes may be made in the foregoing constructions and different embodiments of the invention may be made without departing from the scope thereof, it is intended that all matter contained in the above description and shown in the accompanying drawings shall be interpreted as illustrative and not in a limiting sense.

I claim as my invention:

1. Means for cladding a steel slab with a cuprous facing comprising a mould member having peripheral sealing surfaces, said surfaces lying in a common vertical plane, a flange adapted to be welded in fluid tight relation to the lateral faces of a slab to be cladded, said flange being adapted to be disposed adjacent the face to be cladded, and means for holding said flange and said sealing surfaces in liquid tight relation to form a liquid retaining seal about the face to be cladded.

2. A mould for cladding a slab with a facing metal comprising a mould section having peripheral sealing faces lying in substantially a vertical plane, and a peripheral flange the inner margins of which are adapted to be welded to a slab to be cladded and the outer margins of which lie in a vertical plane, and means for clamping the peripheral sealing faces of the mould section in liquid retaining relation to said outer margins of the peripheral flange.

3. In means for forming a composite metal slab comprising a body of backing metal having a welding face and a layer of facing metal diffusion welded to said welding face by casting said facing metal in a mould space with said welding face forming one wall of said space, flange means adapted to be secured to said body at the margins thereof adjacent said face and in position extending from said body, said flange means providing a clamping face lying in a plane substantially parallel to said welding face, a cooperating mould member adapted to engage said flange means to form a closure and thereby provide a definite mould space one side of which is formed by said welding face, and clamping means for holding said flange means and said mould member in liquid retaining relation.

4. In means for forming a composite metal slab comprising a body of backing metal having a welding face and a layer of facing metal diffusion welded to said welding face by casting said facing metal in a mould space with said welding face forming one wall of said space, flange means adapted to be secured to said body in position extending therefrom along said face, a mould member adapted to cooperate with said flange means to provide a definite mould space one side of which is formed by said welding face, and fluid pressure operated clamping means positioned on opposite sides of said body and arranged and adapted to engage said mould member and flange means for clamping the same in liquid retaining relation.

5. In means for forming a composite metal slab comprising a body of backing metal having a welding face and a layer of facing metal diffusion welded to said welding face by casting said facing metal in a mould space with said welding face forming one wall of said space, flange means adapted to be secured to said body in position extending therefrom along opposite sides thereof, a two part mould member adapted to cooperate with said flange means to provide with said welding face a definite mould space, a pouring sprue located along the parting line of said mould members, a gate at the lower end of said pouring sprue opening into the lower end of said mould space, and clamp means arranged and adapted to engage the two parts of said mould member and said flange means and hold the same in liquid retaining relation.

6. The combination of claim 3 wherein said mould member is recessed to provide at least a part of the mould space.

7. The combination of claim 3 wherein the flange means comprises relatively thin metal angle strip or strips having one leg welded to the margin of the body adjacent the welding face.

THOMAS B. CHACE.